2,618,611

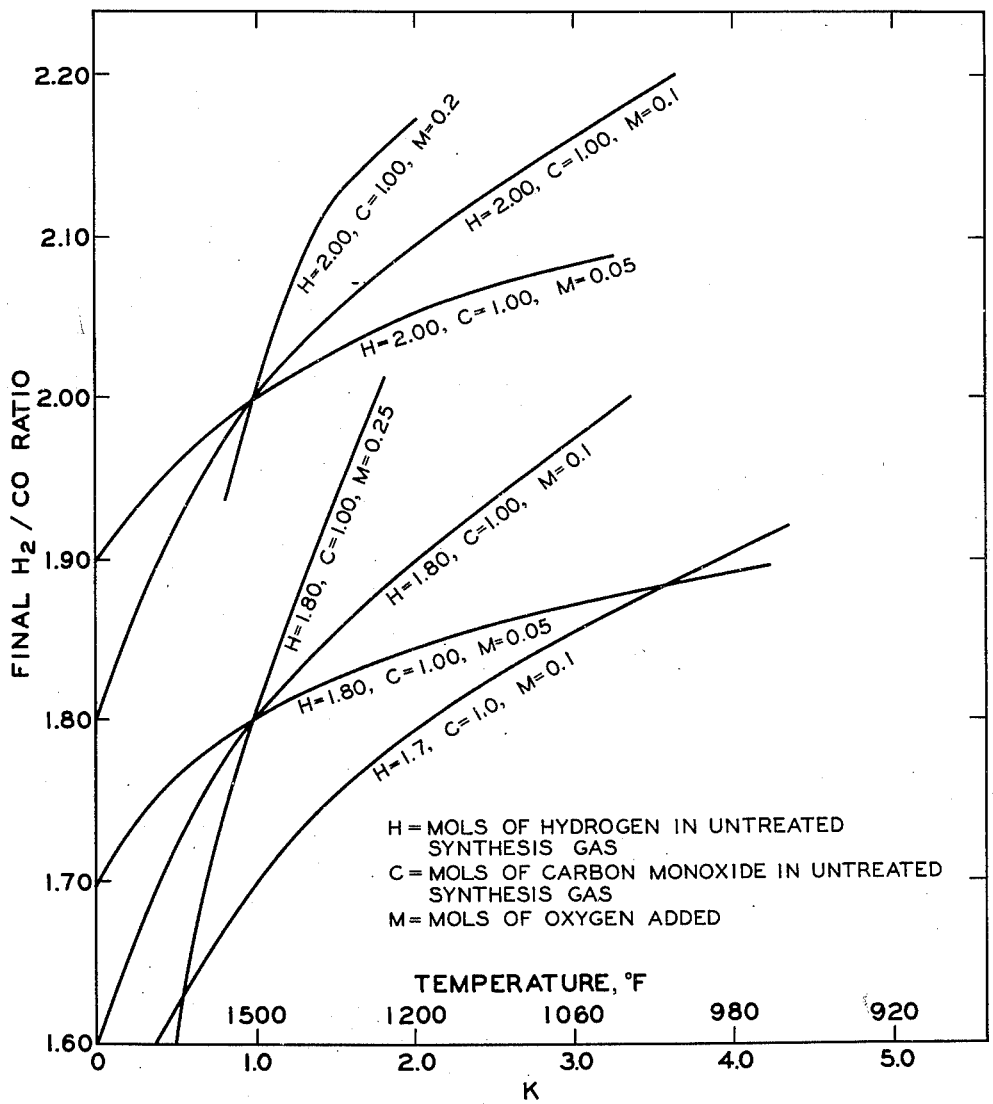
RATIO OF $H_2$/CO OBTAINED BY SHIFTING
GAS IN THE PRESENCE OF OXYGEN
*INVENTOR.*
B. J. MAYLAND Patented Nov. 18, 1952

UNITED STATES PATENT OFFICE 2,618,611

PRODUCTION OF HYDROGEN AND CARBON MONOXIDE SYNTHESIS GAS

Bertrand J. Mayland, Bartlesville, Okla., assignor to Phillips Petroleum Company, a corporation of Delaware Application September 12, 1949, Serial No. 115,208

13 Claims. (Cl. 252—373)

1

This invention relates to a process for increasing the hydrogen to carbon monoxide ratio in a hydrogen- and carbon monoxide-containing synthesis gas produced by such processes as the partial oxidation of methane, natural gas, light hydrocarbons, and other carbonaceous materials. In one of its more specific aspects, it relates to a process for increasing the hydrogen to carbon monoxide ratio of synthesis gas containing primarily hydrogen and carbon monoxide by shifting same in the presence of controlled quantities of oxygen or oxygen-containing gas.

Carbon monoxide and hydrogen synthesis gas produced by the partial oxidation of methane or natural gas with air or oxygen is known to have a hydrogen to carbon monoxide ratio below 2, and quite often in the range of 1.6 to 1.8, however, if the carbonaceous material is heavier than methane, the ratio will be even lower. Because of such low hydrogen to carbon monoxide ratios, is is very desirable, when using this gas as a feed to Fischer-Tropsch synthesis, that the hydrogen to carbon monoxide ratio be built up to at least 2 so that carbon deposition and carbon dioxide formation are suppressed. In other synthesis processes it may be desirable to utilize a feed gas with a hydrogen to carbon monoxide ratio even greater than 2. When such ratios as these are necessary, synthesis gas produced by the usual partial oxidation processes is disadvantageous and must therefore be supplemented to a considerable extent in some manner. It would seem possible that the hydrogen to carbon monoxide ratio could be improved by utilizing a somewhat larger quantity of oxygen in the partial oxidation process, however, if this were to be done, the excess oxygen would cause a considerable rise in reaction temperature and would imperil the refractory lining of the reaction chamber. If one were to operate in this manner, temperatures as high as, and higher than 3000° F., might be developed, and many refractories of today are unable to withstand such temperatures for prolonged periods without considerable deterioration.

The conventional way to raise the ratio of hydrogen to carbon monoxide in a synthesis gas is to shift the equilibrium composition of the carbon monoxide, water, carbon dioxide, and hydrogen by the addition of steam to the partial oxidation reactants. Considerable excess water must be used because of the unfavorable equilibrium at the temperature levels of the partial oxidation reaction, and in addition excess oxygen must be employed to maintain the desired partial oxidation temperature range.

An object of this invention is to provide a process for manufacturing a high hydrogen to carbon monoxide synthesis gas.

Another object of this invention is to provide

2 an improved process for increasing the hydrogen to carbon monoxide ratio in synthesis gas.

Another object of this invention is to provide a process for increasing the hydrogen to carbon monoxide ratio in synthesis gas containing predominantly hydrogen and carbon monoxide at moderate temperatures.

Another object of this invention is to increase the ratio of hydrogen to carbon monoxide in synthesis gas by the use of oxygen or an oxygen-containing gas.

Still another object of this invention is to increase the ratio of hydrogen and carbon monoxide in synthesis gas by catalytically oxidizing a portion thereof at moderate temperatures.

Further objects and advantages of this invention will be apparent to one skilled in the art from the accompanying disclosure and discussion.

I have discovered that the ratio of hydrogen to carbon monoxide in synthesis gas, such as that to be used in Fischer-Tropsch synthesis, may be increased by first quenching the synthesis gas to a temperature below 1500° F. and then catalytically shifting the quenched product over a suitable water-gas shift catalyst in the presence of minor quantities of oxygen or an oxygen-containing gas.

In accordance with my invention a synthesis gas containing predominantly hydrogen and carbon monoxide is contacted with a suitable water-gas shift catalyst at a temperature below 1500° F. and a minor portion of oxygen. I have found, contrary to the teachings of the art such as the article "Selective Combustion of Carbon Monoxide in Hydrogen," by E. K. Rideal, Journal of the Chemical Society, vol. 115, pp. 993–1006, (1919), which teaches that at temperatures above 400° C. hydrogen is burned more quickly than carbon monoxide, that the ratio of hydrogen to carbon monoxide may actually be increased instead of decreased. Other art may be found such as U. S. Patent 1,875,253 to Minotts which teaches that a carbon monoxide and hydrogen synthesis gas may be treated to remove all of the carbon monoxide, but such a process destroys a considerable quantity of hydrogen. The process which I have discovered is an economical and easy method for increasing the ratio of hydrogen to carbon monoxide in a synthesis gas.

In carrying out the process of my invention, synthesis gas, generally of a hydrogen to carbon monoxide ratio below 2, is passed over a suitable catalyst such as reduced iron or a nickel catalyst in the presence of minor quantities of oxygen at a temperature below 1500° F. and above 800° F. A preferred temperature range may generally be considered to be about 950–1200° F. Above this temperature range, the increase in ratio is usually too small and below it the reaction time is generally too long. The synthesis gas and added oxygen are contacted over the catalyst for a period ranging from about 0.01 to 5 minutes, but preferably in the range of 0.01 to 2 minutes. It is usually desirable to operate my process at approximately atmospheric pressure or at a pressure in the range of atmospheric to say 50 to 100 pounds per square inch gauge, or even higher. Suitable quantities of oxygen will depend primarily on the original ratio of hydrogen to carbon monoxide in the synthesis gas, the desired speed of reaction, and on the desired increase in ratio of hydrogen to carbon monoxide. Usually a quantity of oxygen in the range of 0.01 to 0.25 mol per mol of carbon monoxide will be satisfactory. However, under certain specific conditions, quantities outside of this range may be applicable. The quantity of oxygen added varies the increase in the hydrogen to carbon monoxide for a given temperature: the more oxygen, the higher the ratio. The product of the reaction is recovered and may be passed directly to a Fischer-Tropsch synthesis or other synthesis utilizing such gas. Although an increase in carbon dioxide is obtained in practicing my invention, it is not disadvantageous because the Fischer-Tropsch synthesis produces equilibrium quantities of carbon dioxide and a small amount present in the feed will only reduce the quantity formed.

I have found that when a mixture of hydrogen and carbon monoxide is contacted with a shift catalyst below a temperature of 1500° F. the addition of oxygen will increase the hydrogen to carbon monoxide ratio, whereas at temperatures above 1500° F. the hydrogen to carbon monoxide ratio will be decreased. This is borne out by the following calculations.

Let
$H$=mols of hydrogen in original synthesis gas
$C$=mols of carbon monoxide in original synthesis gas
$M$=mols of oxygen added.

Oxygen and carbon monoxide react according to the following formula to give carbon dioxide, $$CO + \tfrac{1}{2}O_2 \rightarrow CO_2 \qquad (1)$$

and hydrogen and oxygen react according to the following formula to give water, $$H_2 + \tfrac{1}{2}O_2 \rightarrow H_2O \qquad (2)$$

The water-gas shift reaction is represented by the following equation.

$$H_2O + CO \rightleftarrows H_2 + CO_2 \qquad (3)$$

Now, assuming that the oxygen added to the synthesis gas is completely used up by reaction with hydrogen and carbon monoxide, the following equations may be written by substituting the following values in Equations 1 and 2, respectively.

$x$=mols of oxygen reacting with carbon monoxide and
$M-x$=mols of oxygen reacting with hydrogen.

$$2xCO + xO_2 \rightarrow 2xCO_2 \qquad (4)$$
$$(2M-2x)H_2 + (M-x)O_2 \rightarrow (2M-2x)H_2O \qquad (5)$$

Let $y$=the mols of water produced in Equation 5 that react by the water-gas shift reaction, then $$yH_2O + yCO \rightarrow yH_2 + yCO_2 \qquad (6)$$

At equilibrium following the water-gas shift, Equations 7, 8, 9, and 10 which follow may be written.

The mols of water present in the equilibrated gas are equal to the mols of hydrogen reacted with the added oxygen, less the portion $y$ of this water reacted in the shift reaction. This may be represented by the equation $$\text{mols } H_2O = 2M - 2x - y \qquad (7)$$

The mols of carbon monoxide present in the equilibrated gas are equal to the mols of carbon monoxide in the original gas less that portion reacted with added oxygen and that utilized in the shift reaction. This may be represented by the equation $$\text{mols } CO = C - 2x - y \qquad (8)$$

The mols of hydrogen present in the equilibrated gas are equal to the mols of hydrogen in the original gas less the amount reacted with the added oxygen to form water plus the amount produced in the water-gas shift. This is shown by the equation $$\text{mols } H_2 = H - (2M - 2x) + y$$
$$= H - 2M + 2x + y \qquad (9)$$

The mols of carbon dioxide present in the equilibrated gas are equal to the mols of carbon monoxide reacted with the added oxygen plus the amount of carbon dioxide produced by the water-gas shift. This is shown by the equation $$CO_2 = 2x + y \qquad (10)$$

The equilibrium constant, $K$, may be represented by the formula $$K = \frac{(H_2)(CO_2)}{(H_2O)(CO)} \qquad (11)$$

By substituting in Equation 11 the respective concentrations and dividing out the common denominators, $(C+M)$, the following equation is derived $$K = \frac{(H - 2M + 2k + y)(2x + y)}{(2M - 2x - y)(C - 2x - y)} \qquad (12)$$

From the equation $$CO = C - 2x - y = C - (2x + y) \qquad (13)$$

it is seen that the quantity of CO consumed may be shown by $(2x+y)$ which will now be indicated by $D$. Also from the equation $$H_2 = H - 2M + 2x + y = H - 2M + (2x + y) \qquad (14)$$

it is seen that the mols of hydrogen consumed may be shown by $2M-(2x+y)$, which will be represented by $F$. Substituting $D$ for $(2x+y)$ in Equation 14, it will be seen that $$F = 2M - D \qquad (15)$$

Substituting $D$ and $F$ for their equivalents in the equilibrium constant Equation 12, the following equations are obtained.

$$K = \frac{(H - 2M + D)D}{F(C - D)} \qquad (16)$$

and $$K = \frac{DH - 2DM + D^2}{FC - FD} \qquad (17)$$

The final ratio of hydrogen to carbon monoxide after equilibrium is determined by dividing Equation 9 by Equation 8 after substituting $D$ and $F$ for their equivalents therein and may be written $$H_2 : CO = \frac{H - F}{C - D} \qquad (18)$$

or $$H_2 : CO = \frac{H - 2M + D}{C - D} \qquad (19)$$

To eliminate the F value in Equation 16 the value $2M-D$, previously derived, is substituted therefor and the following equation obtained.

$$K = \frac{(H-2M+D)D}{(2M-D)(C-D)} \quad (20)$$

The following calculations will show that no matter what the original ratio of hydrogen to carbon monoxide, as long as the equilibrium constant K is 1 the ratio of $H_2:CO$ will not change, the temperature for this being 1500° F. They will also show, as does the attached graph, that as long as the equilibrium constant is above 1 the $H_2:CO$ ratio may be improved even though only a very small amount of oxygen is added. The following arbitrary values have been substituted in Equation 20 with a solution for D. This value is then utilized in solving Equation 19.

$K=1$, $H=1.7$, $C=1$, $M=0.1$ and $H_2:CO=1.7$ $$= \frac{(1.7-0.2+D)D}{(0.2-D)(1-D)}$$

$$1 = \frac{1.5D+D^2}{0.2-1.2D+D^2}$$

$$0.2-1.2D+D^2 = 1.5D+D^2$$

$$2.7D = 0.2$$

$$D = 0.074$$

$$H_2:CO = \frac{1.7-0.2+0.074}{1-0.074} = \frac{1.574}{0.926}$$

$$H_2:CO = 1.7$$

Now, using the same values as above except that $K=0.5$ it will be shown that the $H_2:CO$ ratio is decreased.

$K=0.5$, $H=1.7$, $C=1$, $M=0.1$ and $H_2:CO=1.7$ $$0.5 = \frac{(1.7-0.2+D)D}{(0.2-D)(1-D)}$$

$$0.5 = \frac{1.5D+D^2}{0.2-1.2D+D^2}$$

$$0.1-0.6D+0.5D^2 = 1.5D+D^2$$

$$0 = 0.5D^2 - 2.1D - 0.1$$

$$D = 0.05$$

$$H_2:CO = \frac{1.7-0.2+0.05}{1.0-0.05} = \frac{1.55}{0.95}$$

$$H_2:CO = 1.63$$

Again, using the same values as before except that the equilibrium constant is increased to 2, it is shown that the hydrogen to carbon monoxide ratio is increased.

$K=2$, $H=1.7$, $C=1$, $M=0.1$, and $H_2:CO=1.7$ $$2 = \frac{(1.7-0.2+D)D}{(0.2-D)(1-D)}$$

$$2 = \frac{1.5D+D^2}{0.2-1.2D+D^2}$$

$$0.4-2.4D+2D^2 = 1.5D+D^2$$

$$0.4-3.9D+D^2 = 0$$

$$D = 0.105$$

$$H_2:CO = \frac{1.7-0.2+0.105}{0.105} = 1.79$$

Thus, it has been shown that when the equilibrium constant is one, i. e., when the reaction temperature is at 1500° F., the addition of oxygen to the synthesis gas does not change the ratio of hydrogen to carbon monoxide. It has also been shown that when the equilibrium constant is below one, i. e., the reaction temperature is above 1500° F., the hydrogen to carbon monoxide ratio is affected adversely; but when the equilibrium constant is above one and the reaction temperature below 1500° F. the hydrogen to carbon monoxide ratio is increased.

Calculations similar to those above have been made and the results plotted on the attached graph. As previously stated, when the equilibrium constant of the water-gas shift reaction is one there is no effect on the hydrogen to carbon monoxide ratio, and this constant is one at 1500° F. The abscissa has been shown both in equilibrium constants and temperature in degrees Fahrenheit between which there is a direct relationship. The ordinate is given in the final ratio of hydrogen to carbon monoxide obtained by the practice of my invention.

There are two groups of three curves each which have been plotted, and one single curve. These groupings show that as long as the same ratio of hydrogen to carbon monoxide is present in the gas to be treated, the curves will all cross at a point opposite the original ratio of hydrogen to carbon monoxide and above the equilibrium constant 1. The amount of oxygen used does not affect this point at all showing that at 1500° F. the equilibrium is not changed in either direction by the use of additional oxygen.

Any number of curves may be drawn in each group merely by varying the amount of oxygen added when making the calculations.

The foregoing derivations of equations, the curves drawn therefrom, and the discussion thereof all pertain to the sample gas where only hydrogen and carbon monoxide are present in the initial gas mixture. Inert gases such as nitrogen, helium, methane, etc. in the original gas mixture will have no effect on the equation, curves or discussion. Therefore, the addition of oxygen to a mixture of hydrogen and carbon monoxide or a mixture of hydrogen, carbon monoxide and inert gases in the presence of a water gas shift catalyst at a temperature below 1500° F. will increase the hydrogen to carbon monoxide ratio.

The presence in the original gas mixture of carbon dioxide and water will modify the above equations and the curves drawn therefrom. However, the only effect of these gases will be to change the slope of the curves; the points of intersection remain the same. When carbon dioxide and/or water are present in the original gas mixture, the addition of oxygen to the mixture at a temperature below 1500° F. will increase the hydrogen to carbon monoxide ratio from what it would be in an equilibrium mixture in the absence of oxygen.

Advantages of my invention are illustrated by the following example. The reactants and their proportions, and other specific conditions are presented as being typical and should not be construed to limit the invention unduly.

*Example*

A synthesis gas made from pure methane having the following composition is obtained by partial combustion with oxygen: 60.99 mol per cent $H_2$, 32.10 mol per cent CO, 1.06 mol per cent $CO_2$, 5.85 mol per cent $H_2O$. The hydrogen to carbon monoxide ratio of this gas is 1.9. In order to increase this ratio to above 2, 0.03 mol of oxygen is added per mol of gas and the admixture allowed to come to equilibrium over a reduced iron shift catalyst at a temperature of 1200° F. The composition of the thus obtained gas is 59.99 mol per cent $H_2$, 27.10 mol per cent CO, 6.06 mol per cent $CO_2$, and 6.85 mol per cent $H_2O$, and the hydrogen to carbon monoxide ratio is 2.21. This increase in ratio represents a 15.6 mol per cent decrease in active carbon monoxide in the synthesis gas, however, this is approximately the amount of carbon dioxide formed in a Fischer-Tropsch synthesis if no carbon dioxide is present in the feed to the synthesis step.

If natural gas containing small amounts of heavier hydrocarbons had been used to make the original synthesis gas, the ratio of hydrogen to carbon monoxide would have been between 1.6 and 1.7. A gas of this ratio may also be improved by the addition of oxygen as described.

Although the use of a catalyst of the type described is preferred, the process may be practiced with other water-gas shift catalysts or in the absence of a catalyst.

Although my process has been described and exemplified in terms of its preferred modifications, it is understood that various changes may be made without departing from the spirit and scope of the disclosure and of the claims.

I claim:

1. A process for increasing the ratio of hydrogen to carbon monoxide in a hydrogen- and carbon monoxide-containing gas, which comprises introducing 0.01 to 0.25 mol of oxygen per mol of carbon monoxide to a hydrogen- and carbon monoxide-containing gas and reacting same over a water-gas shift catalyst at a temperature below 1500° F., and above 800° F., and recovering a product of increased hydrogen to carbon monoxide ratio.

2. A process for increasing the ratio of hydrogen to carbon monoxide in a gas containing predominantly hydrogen and carbon monoxide, which comprises introducing 0.01 to 0.25 mol of oxygen per mol of carbon monoxide to a gas containing predominantly hydrogen and carbon monoxide and reacting same in contact with a water-gas shift catalyst at a temperature below 1500° F. and above 800° F., and recovering a product of increased hydrogen to carbon monoxide ratio.

3. A process for increasing the ratio of hydrogen to carbon monoxide in a carbon monoxide and hydrogen synthesis gas, which comprises introducing to a carbon monoxide and hydrogen synthesis gas 0.01 to 0.25 mol of oxygen per mol of carbon monoxide, reacting same in contact with a water-gas shift catalyst at a temperature in the range of 950 to 1200° F., and recovering a product gas of increased hydrogen to carbon monoxide ratio.

4. A process for increasing the ratio of hydrogen to carbon monoxide in a gas containing predominantly hydrogen and carbon monoxide, which comprises reacting a gas containing predominantly hydrogen and carbon monoxide with 0.01 to 0.25 mol of oxygen per mol of carbon monoxide in the presence of a water-gas shift catalyst at a temperature in the range of 950 to 1200° F. and for a period of time in the range of 0.01 to 2 minutes, and recovering a product of increased hydrogen to carbon monoxide ratio.

5. A process for increasing the ratio of hydrogen to carbon monoxide in a gas containing predominantly hydrogen and carbon monoxide, which comprises reacting a gas containing predominantly hydrogen and carbon monoxide with 0.01 to 0.25 mol of oxygen per mol of carbon monoxide in the presence of a water-gas shift catalyst at a temperature in the range of 950 to 1200° F. and for a period of time in the range of 0.01 to 2 minutes, and recovering a product of increased hydrogen to carbon monoxide ratio.

6. A process according to claim 5 wherein said water-gas shift catalyst is a reduced iron oxide catalyst.

7. A process for increasing the ratio of hydrogen to carbon monoxide in a gas containing essentially hydrogen and carbon monoxide which comprises reacting a gas containing essentially hydrogen and carbon monoxide with a quantity of an oxygen-containing gas such that 0.01 to 0.25 mol of oxygen are provided therein per mol of carbon monoxide in the presence of a water gas shift catalyst at a temperature below 1500° F. and above 800° F., a pressure in the range of atmospheric to 100 pounds per square inch gauge, and a contact time in the range of 0.01 to 5 minutes, and recovering a product of increased hydrogen to carbon monoxide ratio.

8. A process according to claim 7 wherein said temperature is in the range of 950 to 1200° F.

9. A process according to claim 7 wherein the water-gas shift catalyst is reduced iron oxide.

10. A process according to claim 7 wherein the water-gas shift catalyst is nickel oxide.

11. A process for manufacturing synthesis gas of a high hydrogen to carbon monoxide ratio which comprises partially oxidizing a hydrocarbon gas, cooling the products of said partial oxidation to a temperature below 1500° F. and shifting same with 0.01 to 0.25 mol of oxygen per mol of carbon monoxide in contact with a water-gas shift catalyst, and recovering from the shift reaction a gas of a higher hydrogen to carbon monoxide ratio than would be otherwise obtained without the presence of said oxygen in said shift reaction.

12. A process for manufacturing synthesis gas of a high hydrogen to carbon monoxide ratio which comprises partially oxidizing a methane-containing gas, cooling the products of said partial oxidation to a temperature below 1500° F. and above 800° F. and shifting same with a quantity of oxygen in the range of 0.01 to 0.25 mol per mol of carbon monoxide present over a water-gas shift catalyst, and recovering from the shift reaction a gas of a higher hydrogen to carbon monoxide ratio than would otherwise be obtained without the presence of oxygen in said shift reaction.

13. A process for the manufacture of synthesis gas of a high hydrogen to carbon monoxide ratio which comprises partially oxidizing a hydrocarbon-containing gas, cooling the partial oxidation products to a temperature below 1500° F., reacting said cooled partial oxidation products with 0.01 to 0.25 mol of oxygen per mol of carbon monoxide in the presence of a water-gas shift catalyst at a temperature in the range of 950 to 1200° F. and for a period of 0.01 to 5 minutes, and recovering a product of a higher hydrogen to carbon monoxide ratio than would otherwise be obtained without the presence of said oxygen in said shift reaction.

BERTRAND J. MAYLAND.

REFERENCES CITED

The following references are of record in the file of this patent:

UNITED STATES PATENTS

| Number | Name | Date |
|---|---|---|
| 2,337,551 | Hansging | Dec. 28, 1943 |
| 2,491,518 | Riblett | Dec. 20, 1949 |